June 9, 1959      E. J. CLARK      2,890,086

BEARING ASSEMBLY

Filed Aug. 22, 1955

INVENTOR
Earl J. Clark
BY
S. E. Ross
ATTORNEY

United States Patent Office 2,890,086
Patented June 9, 1959

2,890,086

BEARING ASSEMBLY

Earl J. Clark, Indianapolis, Ind., assignor to General Motors Corporation, Detroit, Mich., a corporation of Delaware Application August 22, 1955, Serial No. 529,625

1 Claim. (Cl. 308—88)

This invention relates generally to a bearing and more particularly to one for railway cars and to combinations of journal and bearing assemblies.

Among the objects of the present invention are one or more of the following, singly or in combination: to provide an improved bearing construction wherein proper alignment is maintained at all times between the journal and bearing; to provide an improved construction in which replaceable, wear-resistant parts are provided; to provide a construction having improved lubricating means; to provide a bearing of the cartridge type having effective means to seal lubricant in a housing and to prevent entrance of dirt into the housing; to provide a railroad bearing having improved axle end play control; to provide an improved bearing assembly having effective means for dissipating heat of friction to the atmosphere; to provide a bearing assembly that is substantially tamperproof and to provide a construction that can be readily adapted for use with railway cars having bearings of conventional design.

Other objects and advantages of the invention will become more apparent as the description proceeds.

Reference is herewith made to the accompanying drawing illustrating a construction in accordance with one embodiment of the invention.

Figure 1:
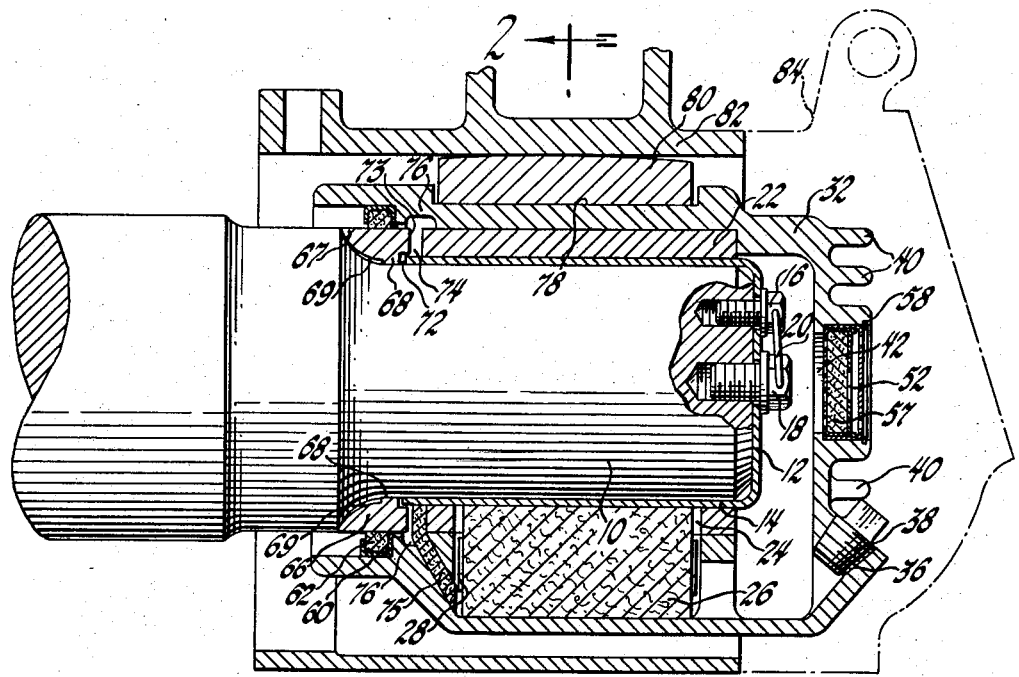
Figure 1 is a longitudinal section through a bearing, housing and axle.
Figure 2:
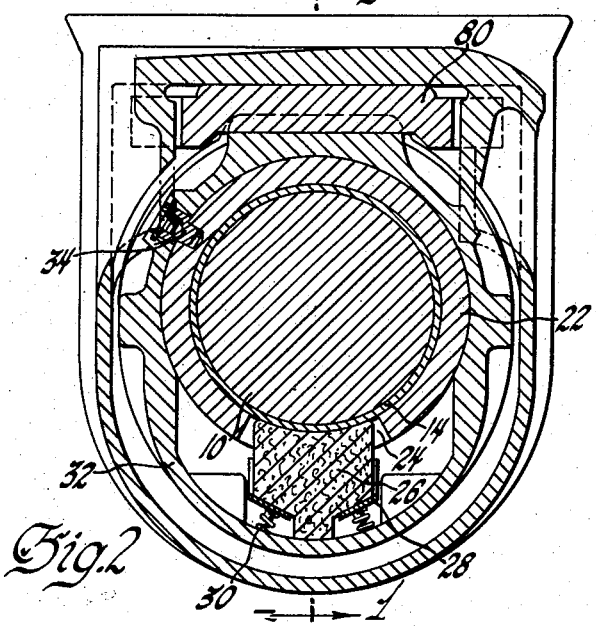
Figure 2 is a cross-sectional view on line 2—2 in Figure 1.
Figure 3:
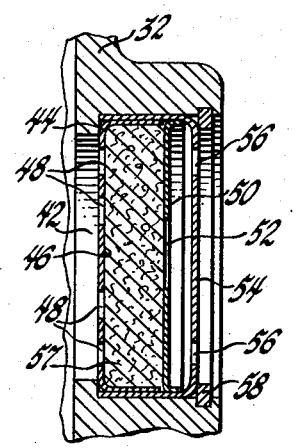
Figure 3 is a view on an enlarged scale of a portion of construction shown in Figure 2.

In the drawing, 10 represents a journal or axle for a railroad freight car. At the right-hand end of the axle there is provided a hardened steel cup-shaped member 12, the side walls of which form a sleeve 14. The cup-shaped member is shrink-fitted over the end of the axle 10 to secure the same thereto. The cup-shaped member is additionally secured to the axle by means of screws 16 and 18. A locking device 20 keeps the screws from loosening. The cup-shaped member 12 may be made of any suitable wear-resistant material. In the construction illustrated it is a hardened steel member formed by shaping low carbon sheet steel to cup-shape, thereafter carbonitriding the outer surface thereof and finally hardening the carbonitrided part. During operation, the sleeve portion 14 of the cup is in effect a portion of the journal 10. The replaceable cup may be removed should wear or scoring occur and a new one put on in its place.

A sleeve type bearing 22 is shown in bearing engagement with sleeve portion 14 of the journal. The sleeve bearing 22 has an opening therein at the underside thereof as indicated at 24. Within the opening and in contact with the hard sleeve 14 is a felt or other wick-type lubricator 26. The wick is carried by a sheet metal frame 28. A plurality of similarly shaped springs 30 bias the wick into contact with the journal sleeve 14. The bearing 22 may be formed of any suitable bearing material, a highly satisfactory material being an aluminum alloy in accordance with Schluchter United States Patent No. 2,238,399.

The bearing 22 is carried by a housing 32 and is secured thereto by dowels 34. The housing is adapted to contain a supply of oil for lubricating the journal by means of the wick. The housing has a screw threaded opening 36 for admitting oil to the housing. This opening is closed by a screw plug 38. The housing also has a series of fins 40 which act to dissipate frictional heat. In the wall of the housing above the filler opening is an opening 42 within which is a breather cap assembly 44. The breather cap assembly comprises a sheet metal member 46 having a plurality of openings 48 therein, a second sheet metal member 50 spaced from the member 46 and having a central opening 52 therein, and a third member 54 spaced from member 50 and having a plurality of openings 56 near the periphery thereof. The space between members 46 and 50 is filled with a material such as felt or woven wire mesh 57. It will be noted that the openings in the members 46, 50 and 54 are so located that air or other fluid passing through the breather assembly is required to follow an indirect path. The effect is to permit air to pass in and out as occasion demands but to retain oil within the housing. The breather assembly 44 is held in place in the housing wall by ring 58.

At the end of the housing 32 opposite that which carries the breather assembly there is provided a portion 60 forming a support for an oil seal 62. The outer periphery of the oil seal contacts the housing and the inner periphery contacts a hardened thrust ring 66 secured to the axle 10 by a shrink fit. The thrust ring is so formed as to have portions 67 and 68 contacting the journal so as to leave a space at 69 between it and a portion of the axle 10. The shrink fitted thrust ring also has a cutaway portion 72. The thrust ring may be formed of a hard wear-resistant material. Carbonitrided and hardened steel is a satisfactory material. The face 73 of the thrust ring is normally spaced at 74 from the end of the sleeve bearing 22 as illustrated in Figure 1. However, when going around a curve or otherwise when there are forces causing relative movement between the bearing and axle, this space 74 will close and the end of the bearing sleeve will contact the face 73 of the thrust ring. In order to lubricate these faces there is provided a wick lubricator 75, the lower end leading to the oil supply in the housing and the upper end being mounted in a cutaway portion of the lower portion of the sleeve bearing. Adjacent the left-hand end of the bearing there is provided an annular groove 76 in the housing to permit return of excess oil to the lower portion of the housing. The upper portion of housing 32 is provided with a seat 78 for a pad 80 which in turn contacts a housing 82. This housing 82 may be the same as that conventionally employed with railroad cars. In phantom outline, as indicated at 84, is shown the outline of the conventional construction. The present construction may be employed with the conventional construction without removing the portion indicated in dotted outline. On the other hand it is preferred to entirely eliminate this portion of the conventional structure.

From the foregoing it will be apparent that the present construction incorporates a one-piece housing which surrounds the journal and which contains the bearing lubricant and oil seal. The full round bearing maintains proper journal and bearing alignment, whereas in conventional designs incorporating a pad bearing the journal is free to roll out of the bearing under impact conditions. By means of the hard replaceable sleeve journal wear and scoring is reduced greatly. The bearing is effectively lubricated by a wick held in fixed position with a controlled pressure against the journal. Grabbing of the wick material is eliminated. The construction provides an effective oil seal to retain the lubricant in the housing and to prevent entrance of dirt into the housing. The life of the seal is extended by running on a smooth hard thrust ring. The relatively simple seal is made possible because the journal motion is closely controlled by the bearing. Axle end play control is improved by the increased thrust area, by positive lubrication of the bearing thrust surface, and by use of the hardened steel thrust ring shrunk on the axle. The ring is of hard wear-resistant material to decrease thrust ring and bearing wear and scoring. By means of the full round bearing having a large area of contact with the housing heat transfer is improved. The heat transfer is further improved because the lower portion of the bearing is near the free oil in the sump in the housing. In addition splashing of the oil on the bearing aids in transferring the heat to the bearing housing. By means of the large radiating area of the bearing housing 32 the heat of friction is effectively dissipated to the atmosphere. The bearing assembly is tamper-proof since the railway car must be raised to gain access to the inner moving parts, the lubricant and the lubricator. The breather assembly readily permits air to flow into and out of the cartridge housing to minimize pressure differentials in the housing. Without this feature the pressure differentials tend to cause oil loss through the oil seal.

Numerous changes and modifications of the embodiment of my invention disclosed herein may be made without departing from the principle and spirit of the invention.

I claim:

A journal and bearing assembly comprising a journal having a hard replaceable sleeve shrink-fitted thereon, a bearing surrounding said sleeve, the lower portion of said bearing having an opening therein, a wick type lubricator in said opening, resilient means for biasing said lubricator into contact with said sleeve, a hardened thrust ring shrink-fitted to said journal and having a face in alignment with the inner end of said bearing, a housing surrounding the journal, bearing, lubricator and thrust ring, breather means for said housing, means for admitting oil to said housing, an oil seal interposed between the thrust ring and inner end of the housing, wick means extending from the lower portion of the housing to the inner end of the bearing for lubricating the end of the thrust ring adjacent the end of the bearing, and an annular groove in the housing adjacent the thrust ring and adjacent bearing end for returning excess lubricant to the lower portion of the housing.

References Cited in the file of this patent

UNITED STATES PATENTS

| | | |
|---|---|---|
| 191,901 | Tomlinson | June 12, 1877 |
| 274,159 | Whiting | Mar. 21, 1883 |
| 631,400 | Korbuly | Aug. 22, 1899 |
| 1,012,218 | Ono | Dec. 19, 1911 |
| 1,416,884 | Schmidt | May 23, 1922 |
| 2,197,499 | Heinze | Apr. 16, 1940 |
| 2,296,726 | Mohun | Sept. 22, 1942 |
| 2,430,359 | Messinger | Nov. 4, 1947 |
| 2,498,520 | Blackmore | Feb. 21, 1950 |
| 2,754,161 | Bouvat-Martin | July 10, 1956 |

FOREIGN PATENTS

| | | |
|---|---|---|
| 326,760 | France | June 5, 1903 |